United States Patent [19]
Gallagher

[11] Patent Number: 5,804,121
[45] Date of Patent: Sep. 8, 1998

[54] METHOD OF FORMING A MOTOR VEHICLE INSTRUMENT PANEL WITH A FLEXIBLY TETHERED AIR BAG DEPLOYMENT DOOR

[75] Inventor: Michael J. Gallagher, Hampton, N.H.

[73] Assignee: Davidson Textron Inc., Dover, N.H.

[21] Appl. No.: 426,104

[22] Filed: Apr. 21, 1995

[51] Int. Cl.⁶ .......................... B29C 39/10; B29C 45/02; B29C 45/14; B29C 67/08
[52] U.S. Cl. .......................... 264/250; 264/255; 264/259
[58] Field of Search ...................... 264/240, 250, 264/254, 255, 259, 328.4, 328.5, 328.6, 308, 309

[56] References Cited

U.S. PATENT DOCUMENTS

| | | | |
|---|---|---|---|
| 5,002,307 | 3/1991 | Heidorn | 264/328.6 |
| 5,013,065 | 5/1991 | Kreuzer | 280/743 |
| 5,116,079 | 5/1992 | Rhodes, Jr. | 280/732 |
| 5,131,678 | 7/1992 | Gardner et al. | 264/293 |
| 5,320,381 | 6/1994 | Barnes et al. | 280/728 |
| 5,335,939 | 8/1994 | Kuriyama et al. | 280/728 |
| 5,466,412 | 11/1995 | Parker et al. | 264/255 |

FOREIGN PATENT DOCUMENTS

| | | |
|---|---|---|
| 4143145 | 5/1992 | Japan . |
| 2250295 | 6/1992 | United Kingdom . |

Primary Examiner—Angela Ortiz
Attorney, Agent, or Firm—Reising, Ethington, Learman & McCulloch, PLLC

[57] ABSTRACT

A method of forming a motor vehicle instrument panel with a flexibly tethered air bag deployment door comprises the steps of molding an instrument panel with a first plastics material to a desired shape and with an integral air bag deployment door whose opening is defined by a tear seam formed by a groove molded in one side of the panel and with an integral mounting/hinge flange that extends from an inner side of the door, and forming a bonded layer of second plastics material on one side of the flange and the inner side of a potentially frangible portion of the door. The second plastics material has the physical characteristic of remaining ductile to a substantial degree at low temperatures substantial below the temperature at which the first plastics material becomes brittle and as a result the bonded layer forms a tether that connects the frangible door portion to the mounting/hinge flange in a flexible manner when this door portion breaks away from the flange because of embrittlement of the first plastics material at the low temperatures on tearing of the tear seam and opening movement of the door by an inflating air bag pressing against the inner side of the frangible door portion.

12 Claims, 3 Drawing Sheets

METHOD OF FORMING A MOTOR VEHICLE INSTRUMENT PANEL WITH A FLEXIBLY TETHERED AIR BAG DEPLOYMENT DOOR

TECHNICAL FIELD

This invention relates to motor vehicle instrument panels having an integral air bag deployment door defined by a tear seam and more particularly to a tether for a potentially frangible air bag door when it is separated at very low temperatures from the instrument panel and then because of cold embrittlement from a flexible hinge that is integral with the door and normally provides through bending movement for opening swinging movement of the door and its retention to the vehicle structure at higher temperatures.

BACKGROUND OF THE INVENTION

Presently, most passenger side air bag doors are formed in an air bag cover that is separate from the instrument panel because the latter is made of various commercially available thermoplastic materials that are particularly well suited to meeting the requirements of its application but are not well suited to meeting the requirements of an air bag door that is defined by a tear seam formed in a single layer instrument panel. For example, the plastics materials used to make such an instrument panel must have a certain degree of stiffness and high heat resistance to meet the requirements of its application but the materials that are currently available for such an application do not retain ductility and become embrittled at very low or cold temperatures. This lack of low temperature ductility is undesirable for air bag deployment where the air bag door is formed integral with and defined by a tear seam that is formed in the instrument panel and is torn to provide an air bag deployment opening in the panel by the force of the inflating air bag acting on the panel in the area of the tear seam. Styrene-maleic anhydride, polypropylene, polycarbonate and polyurethane are examples of thermoplastic materials that are suitable for such an instrument panel but do not have the required ductility for such a tear-open air bag door at very low temperatures and as a result a portion or portions of the door may fracture and separate from the instrument panel on deployment of the air bag and undesirably enter the space of the passenger compartment. To meet extreme low temperature requirements, many various designs of an air bag deployment door have been proposed wherein the door is made separate from the panel and is installed as a hinged door assembly on the instrument panel so that the door is not prone to fracture from cold embrittlement by the force of the inflating air bag as it freely swings open on its hinge from the force of the air bag.

Costs can be reduced, quality can be improved and styling can be enhanced by molding the instrument panel and the air bag cover including an integral air bag deployment door in one piece at the same time out of the same commercially available material. That is provided that the normal material requirements for the instrument panel are not sacrificed while the safe assured operability of the integral air bag deployment door is still somehow retained at reasonable cost even though its plastics material is not well suited thereto.

SUMMARY OF THE PRESENT INVENTION

In the present invention, a molded motor vehicle instrument panel made of a commercially available thermoplastic material well suited for the primary purpose of such a panel has an integral air bag deployment door for a passenger side air bag that is safely retained to the vehicle structure in a very cost effective manner. The air bag door is defined by a tear seam in the panel and is normally retained by an integral flexible mounting/hinge flange to a part of the vehicle structure when the seam is torn by the inflating air bag and wherein this flange which before was integral with both the door and the panel is then separated from the main body of the panel while remaining integral with the door and bends to allow the door to swing open to allow deployment of the air bag through an opening in the instrument panel while retaining same to the vehicle structure as the door is then free of the instrument panel. At very low temperatures, a portion of the air bag door can break away from the mounting/hinge flange where it joins therewith because of plastic embrittlement at these low temperatures and the high bending stresses encountered at this juncture.

This separation of the broken door portion from the vehicle structure is prevented by bonding a layer of second plastics material over the juncture zone and an adjoining inner side of the potentially frangible door portion and an adjoining one side of the mounting/hinge flange. The second plastics material has the physical characteristic of remaining ductile to a substantial degree at low temperatures substantially below the temperature at which the first plastics material becomes brittle. The bonded layer thus forms a tether that tethers the frangible door portion to the mounting/hinge flange in a flexible manner when this door portion breaks away from the flange because of embrittlement of the first plastics material at the low temperatures on tearing of the tear seam and opening movement of the door by the inflating air bag pressing against the inner side of the frangible door portion. This allows the broken door portion to continue movement in it opening direction to allow continued deployment of the air bag while the broken door portion remains connected by the flexible tether to the mounting/hinge flange and thereby the vehicle structure.

The instrument panel and the air bag deployment door tethering layer may be formed in various ways including injection molding the panel and injection molding, spraying or low pressure molding the tethering layer in a second step. Such formation of the tether in place as a bonded layer is particularly advantageous from both a cost and production standpoint as it becomes integral with the instrument panel and there is no need to inventory a separate tether that must then be fastened by some form of fastening means to both the mounting/hinge flange and the door. Furthermore, the bonding of the tethering layer to the inner side of the door hides its presence from view which is desirable from an appearance or styling standpoint.

It is therefore an object of the present invention to provide a new and improved method of forming a motor vehicle instrument panel with an integral air bag deployment door and a flexible tether for the door.

Another object is to provide a new and improved method of forming a motor vehicle instrument panel with an integral air bag deployment door and a flexible tether for the door at low cost and of high quality and to meet certain styling desires.

Another object is to provide a method of forming a motor vehicle instrument panel with a tethered air bag deployment door wherein the panel including the door is formed of a plastics material suited to meet the requirements of an instrument panel and the tether is formed of a layer of plastics material that spans a potential fracture zone in the door and remains ductile at low temperatures that cause embrittlement of the door that could result in the fracturing of a portion of the door at thus fracture zone on air bag deployment and loss of its retention to the vehicle structure but for the tethering layer.

Another object is to provide a method of forming a motor vehicle instrument panel including an air bag deployment door that is defined by a tear seam molded in the panel wherein the panel is formed of a plastics material suited to its requirements and the door is retained to the vehicle structure on breaking away at very cold temperatures by a flexible layer of plastics material that is formed in place over an inner side of the door and one side of a mounting/hinge flange that is molded integral with the inner side of the door and normally retains the air bag door to the vehicle structure on opening movement.

Another object is to provide a low cost, high quality motor vehicle instrument panel with flexibly tethered air bag deployment door produced by the above method.

These and other objects, advantages and features of the present invention will become more apparent from the following description and the accompanying drawings wherein:

DETAILED DESCRIPTION OF THE DRAWINGS

Figure 1:
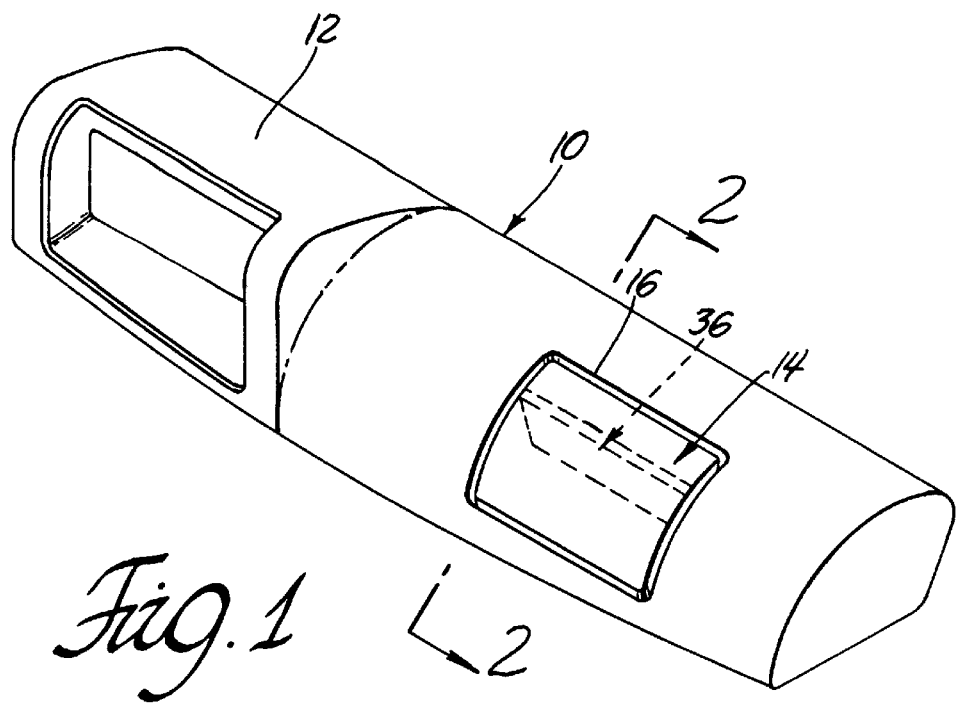
FIG. 1 is a perspective view of a motor vehicle instrument panel including integral air bag deployment door with a flexible tether made according to the present invention and as installed in a motor vehicle over an air bag system.
Figure 2:
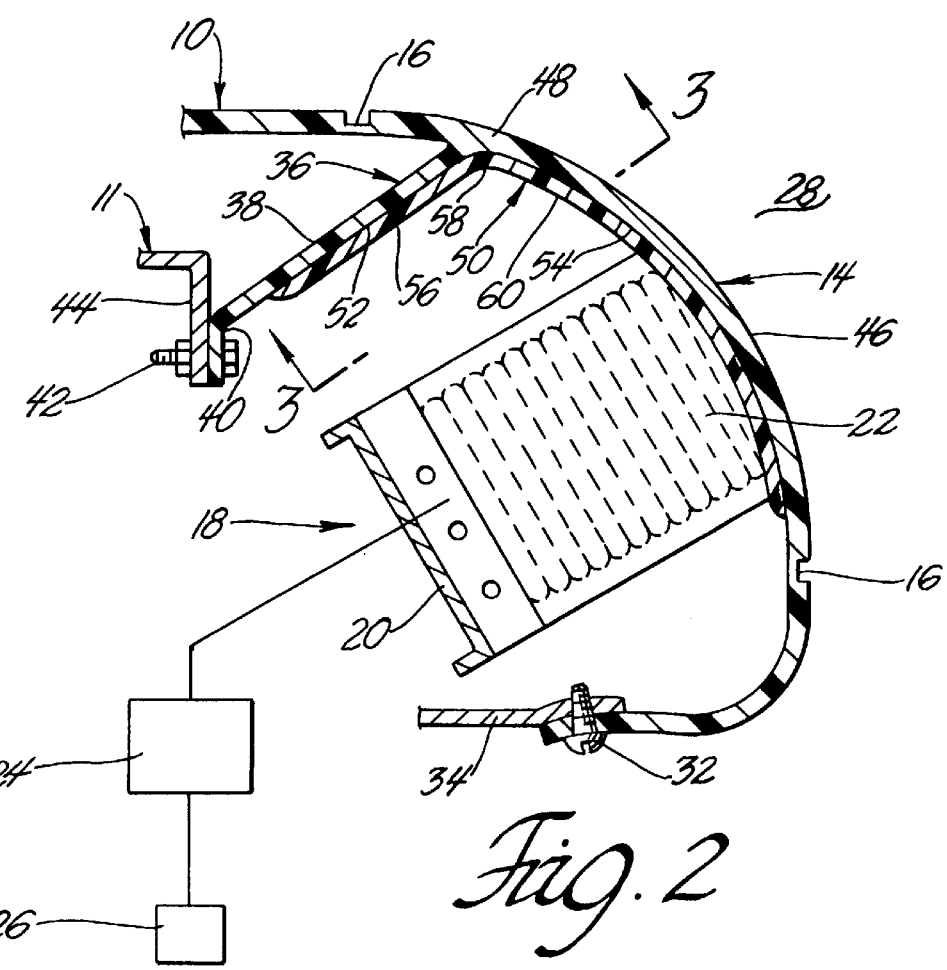
FIG. 2 is an enlarged view taken along the line 2—2 in FIG. 1 when looking in the direction of the arrows.

Referring to FIGS. 1 and 2, there is illustrated a molded motor vehicle instrument panel 10 as installed in a motor vehicle structure generally designated as 11. The instrument panel 10 has a contoured section 12 on the driver side for the installation of an instrument cluster (not shown) and an air bag deployment door 14 of rectangular shape on the passenger side that is defined by a tear seam 16 molded in the instrument panel. The tear seam 16 may be formed by a groove either in the face of the panel as shown or by a similar groove in the back side of the panel to hide the tear seam from view as is well known in the art. The instrument panel covers an air bag system 18 that is located behind the instrument panel directly behind the air bag door 14 and is mounted on a sheet metal portion 20 of the vehicle structure at the front of the passenger compartment. The air bag system 18 is of a conventional type that includes an inflatable air bag 22, a gas generator 24 and a controller 26 that includes a vehicle impact sensor and triggers ignition of the gas generator to inflate the air bag for deployment into the passenger space 28 directly in front of a passenger seated on this side.

Figure 4:
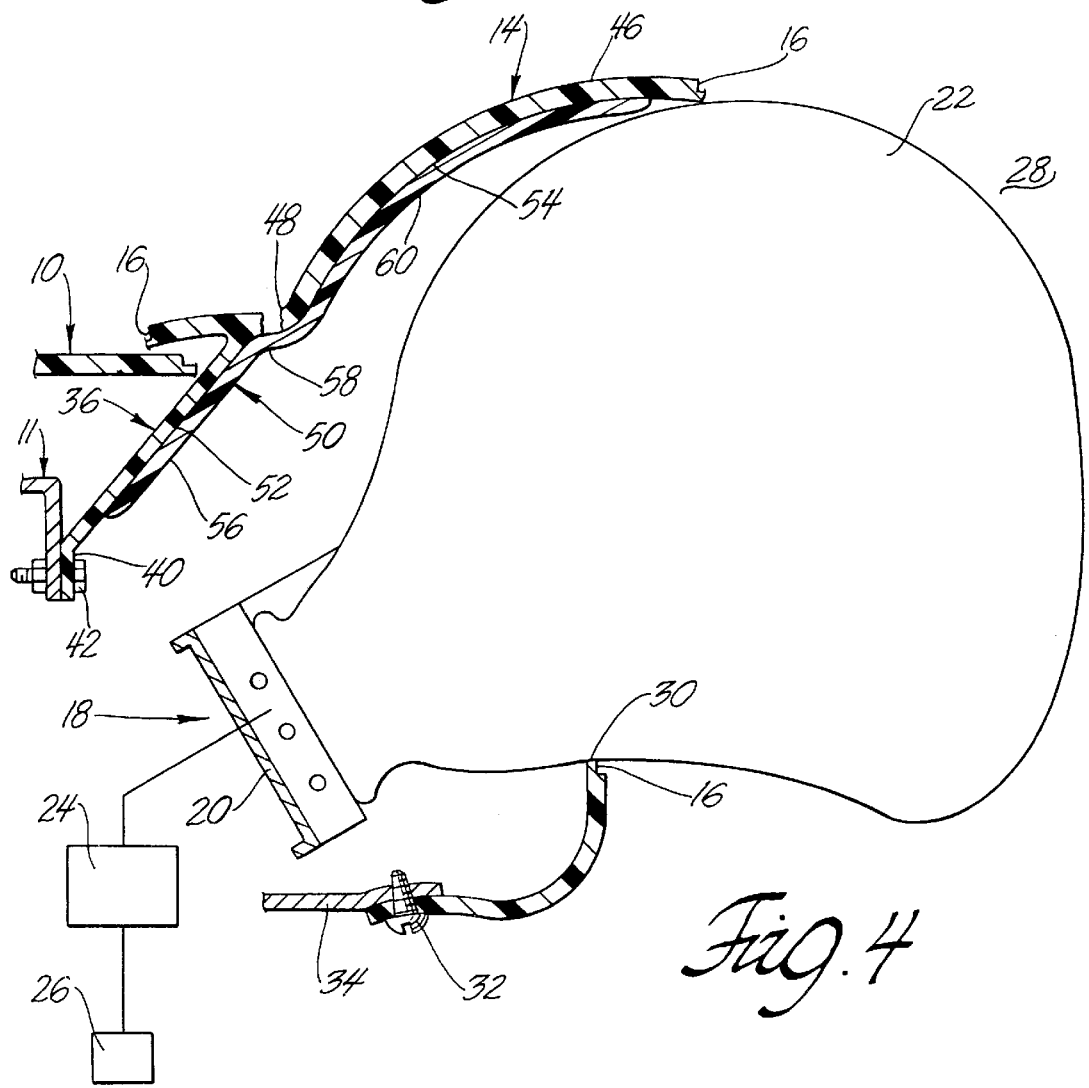
FIG. 4 is a view like FIG. 2 but showing the air bag door opened and broken during the deployment of the air bag at a very low temperature.

The instrument panel 10 is a molded one-piece part of generally uniform wall thickness and is formed of a suitable commercially available thermoplastic material such as styrene-maleic anhydride, polypropylene, polycarbonate and polyurethane that provides sufficient stiffness so that the panel is self-supporting to maintain the desired shape and has sufficient heat resistance to resist deformation due to heat in its interior vehicle environment where it is located immediately behind the windshield (not shown). The instrument panel may be molded in various conventional ways including injection molding as is well known in the art. The groove forming the tear seam 16 is made deep enough in relation to the wall thickness of the instrument panel and the strength of the plastic material used so as to sufficiently weaken the wall section at the tear seam to the point that it is torn by the force of the inflating air bag acting against the back or inner side of the air bag door and creates on its separation from the instrument panel an opening 30 therein for the deployment of the air bag as illustrated in FIG. 4 and described in more detail later.

The instrument panel 10 is fastened to portions of the vehicle structure 11 at various locations outside the area of the air bag door with one such location being shown in FIG. 2 wherein a sheet metal screw 32 fastens the panel at a lower edge thereof beneath the air bag door to a sheet metal portion 34 of the vehicle structure. And it will be understood that similar screws or other conventional type fasteners are used at other locations outside the area of the air bag door to securely fasten the instrument panel in place on the vehicle structure.

Figure 3:
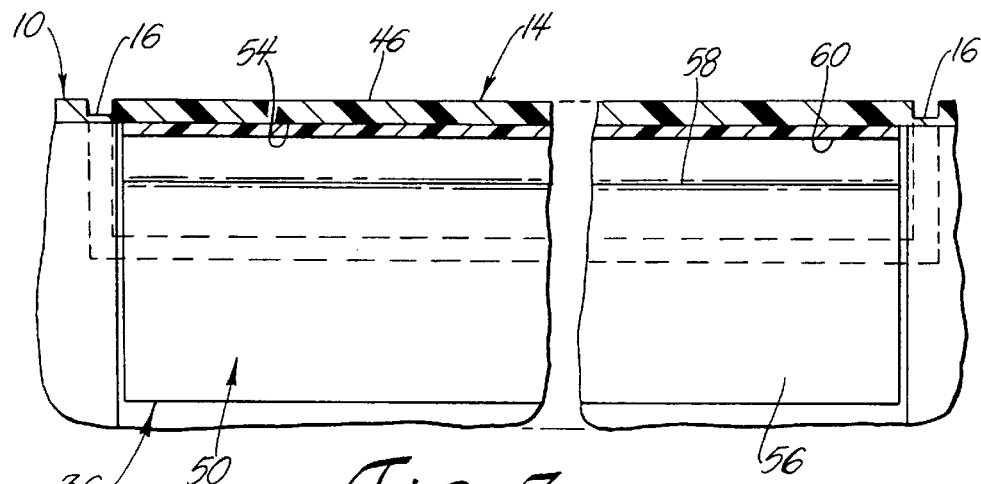
FIG. 3 is a view taken along the line 3—3 in FIG. 2 when looking in the direction of the arrows.

The air bag deployment door 14 in the instrument panel 10 is separately fastened to the vehicle structure by an elongated mounting/hinge flange 36 that is molded integral with the back inner side of the door and extends horizontally along substantially the entire length and adjacent to the upper edge thereof as seen in FIGS. 1–3. The flange 36 has a flat rectangular portion 38 that extends inwardly of the door a substantial distance and terminates in a flat, rectangular, angled, horizontally extending, distal portion 40 that is fastened along its length by bolts 42 to a sheet metal portion 44 of the vehicle structure. The flange 36 is also formed with a controlled thickness and is capable of elastic bending to a significant degree in the rectangular portion 38 in a certain substantial temperature range and down to a certain low temperature (e.g. −20° F.) without breaking and thereby act as a cantilever hinge to normally provide for outward swinging opening movement of the door when the door is separated along the tear seam from the instrument panel for air bag deployment. Prior to such air bag door separation, the flange 36 acts to fasten the instrument panel to the vehicle structure at the air bag door and also provides support for the latter against a pushing force such as from a passenger which could otherwise push the door inward and separate the door from the instrument panel along the tear seam.

The flange 36 is designed to normally hinge and retain the air bag door 14 to the vehicle structure during its outward opening movement when the tear seam 16 is torn by the force of the inflating air bag and in doing so is highly stressed at its juncture 48 with the door as the flange portion 38 bends to effect swinging movement of the door. However, at very low or cold temperatures such as −20° F. and below, the typical commercially available plastic material suitable for the instrument panel in its primary application can become brittle to the point where the lower and major portion 46 of the door, that is forced by the inflating air bag to bend outward about the horizontally extending juncture 48 of the door with the flange 36, may fracture or break off at this highly stressed location or zone (see FIG. 4) and enter into the passenger space 28. This is prevented in a very cost effective manner by the strategic addition of a flexible door tethering layer 50 of controlled thickness that is formed in place over the one side 52 of the mounting/hinge flange 36 adjoining the potential fracture zone 48, over this zone, and over the inner side 54 of the potentially frangible door portion 46. The material forming the door tethering layer 50 is a flexible plastics material of a prescribed controlled thickness that is formed in place as described in more detail latter, bonds in its formation without an added adhesive to the material of the instrument panel, and remains flexible or ductile at temperatures substantially below that at which the material of the instrument panel 10 including the integral air bag deployment door 14 becomes brittle. Examples of such material for the tethering layer 50 that will remain flexible or ductile at temperatures as low as −60° F. are polyurethane elastomers, polyester elastomers, and polyolefin elastomers. And it will be understood of course that the tethering material while well suited for its application is not suited to meet the stiff requirements of the instrument panel.

The flexible tethering layer 50 extends horizontally substantially the entire length of the mounting/hinge flange 36 and is bonded to the side 52 of the flat flange portion 38 at a margin portion 56 of the tethering layer that extends laterally to the distal flange portion 40 so as to maximize the bonding area on this side of the potential fracture zone 48 and thereby maximize the retention of the tethering layer to the flange 36. The tethering layer 50 spans and is bonded to the potential fracture zone 48 at an intermediate portion 58 of the tethering layer and is bonded to the inner side 54 of the potentially frangible air bag door portion 46 at a margin portion 60 that extends laterally to near the lower edge of the door so as to maximize the bonding area of the tethering layer with this door portion and its retention to the flange 36.

Referring to FIG. 4, the tethering layer 50 at its intermediate portion 58 that spans the potential fracture zone flexes when door breakage occurs because of cold plastic embrittlement to permit the broken door portion 46 to continue to swing outward and upward about the line of fracture at the flange 36 to provide for continued air bag deployment while retaining the broken door portion safely to the vehicle structure with the tethering layer 50 and flange 36. The bonded retention of the tethering layer over substantially the entire inner side of the separated door portion 46 and that of the bending portion 38 of the flange 36 maximizes the retention forces available from the tethering layer 50 across the door fracture to retain the broken door portion 46 to the flange 36 and thus to the vehicle structure. And the controlled thickness of the tethering layer 50 is determined in relation to the tensile strength of it plastics material so as to not fail in bending tension at its intermediate portion 58 at the greatest anticipated forces acting thereon from the propelled mass of the broken door portion 46. However, it will also be understood that the intermediate bending portion 58 of the tether layer 50 could have a greater thickness than the adjoining margin portions 58 and 60 for greater tensile strength as necessary in a particular application to conserve material and/or space.

The instrument panel 10 including the integral air bag deployment door 14 and the mounting/hinge flange 36 is molded in one-piece at one time of the same plastics material such as that previously described which is suitable for the primary purpose of an instrument panel wherein it must be sufficiently stiff for self support and resistant to heat. The instrument panel 10 is molded in a conventional manner well known in the art and may be formed for example in an injection mold or reaction injection mold whose mold cavity completely defines the surfaces of the instrument panel including the groove defining the tear seam 16 in either the outer or inner side.

Figure 5:
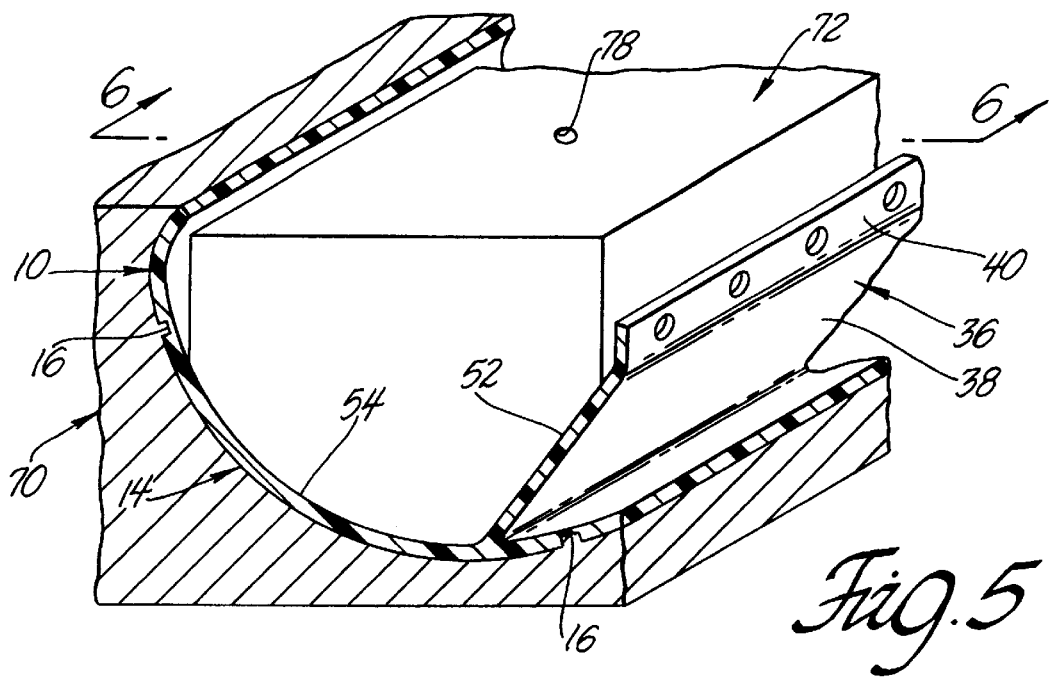
FIG. 5 is a fragmentary perspective view of mold tools used to mold the flexible tethering layer in FIGS. 2 and 3 and includes a sectional view of the instrument panel as molded and then located between these tools for the molding of the flexible tethering layer.
Figure 6:
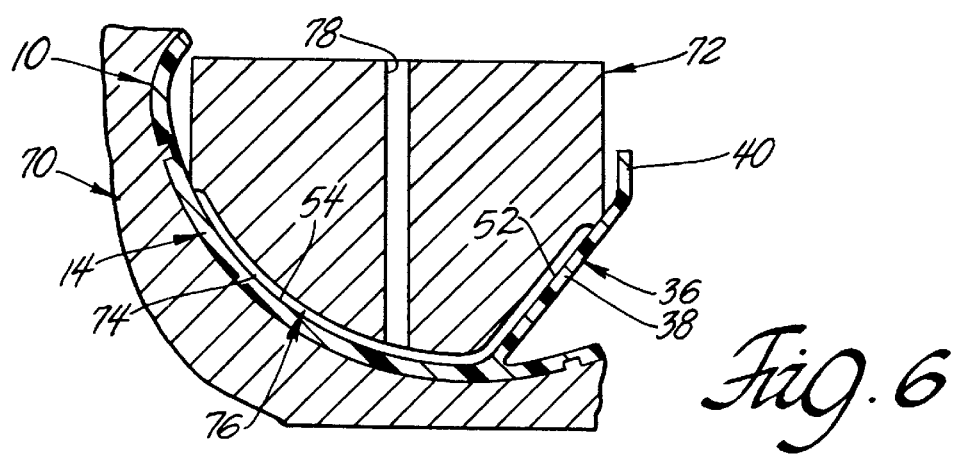
FIG. 6 is view taken along the line 6—6 in FIG. 5 when looking in the direction of the arrows.

Referring to FIGS. 5 and 6, there is shown the appearance side mold tool 70 of an injection mold used to mold the appearance or front side of instrument panel 10 which is shown in place as molded thereby in these illustrative views and wherein the flexible tethering layer is yet to be formed. And it will be understood that the injection mold for the instrument panel 10 further includes another mold tool (not shown) that defines the back side of the panel and cooperates with the mold tool 70 to form a mold cavity into which the plastics material for the panel is injected in molten form under pressure in a conventional manner. With the molded instrument panel 10 left in place in the mold tool 70 and the back side mold tool moved out of the way, the air bag deployment door tethering layer 50 may then be formed in place with an injection mold tool 72 that seats against the inner side of the instrument panel over the area in which the tethering layer 50 is to be formed and which includes the side 52 of the mounting/hinge flange 36 and the inner side 54 of the frangible door portion 46. It will also be understood that the instrument panel could be supported by a dedicated support tool that is much smaller than the instrument panel mold tool 70 and has a similar support surface that just spans the area of the outer side of the molded instrument panel opposite where the tethering layer is to be formed. The injection mold tool 72 is formed on its molding side with a tethering layer defining cavity 74 that is closed by the side 52 of the mounting/hinge flange 36 and the inner side 54 of the frangible door portion 46 and defines therewith a closed mold cavity 76 that defines the entirety of the tethering layer shape.

The mold tools 70 and 72 with the instrument panel 10 located there between are clamped together in a conventional type plastics injection molding machine (not shown) and the tethering plastics material as earlier described is injected in molten form under high pressure in a conventional manner through a passage 78 in the mold tool 72 into the closed mold cavity 76 to form the flexible tethering layer 50. It will also be understood that a low pressure mold tool with a tethering layer defining mold cavity like the cavity 74 in mold tool 72 but with the low pressure mold tool suitably adapted in a conventional manner for gravity molding, reaction injection molding, or resin transfer molding of the tethering layer with reactive components of the plastics material can also be used to mold the tethering layer in place on the inner side of the instrument panel. In either case, the plastics material forming the tethering layer chemically bonds without an added adhesive to the inner side of the instrument panel to form a strong attachment thereto over the entire extensive interface between the tethering layer 50 and both the mounting/hinge flange 36 and the frangible door portion 46.

Figure 7:
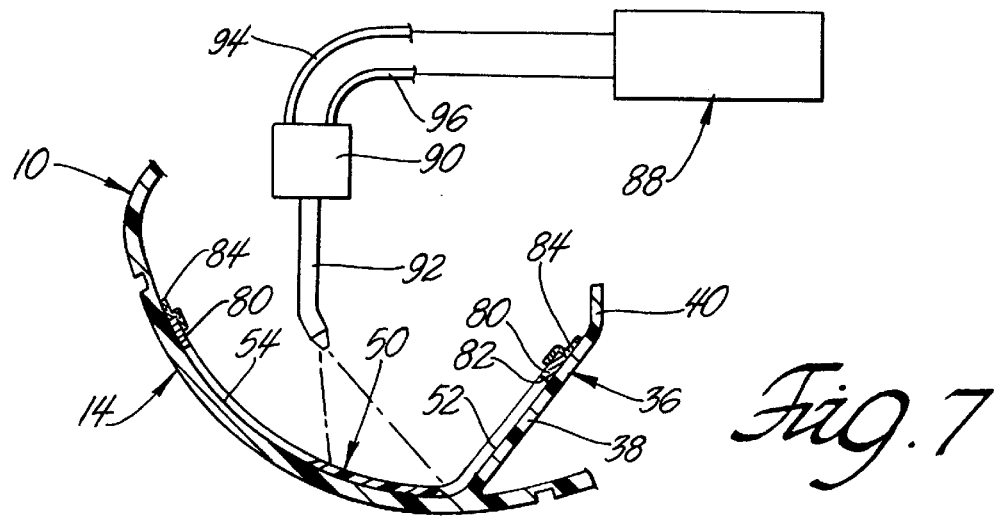
FIG. 7 is a sectional view of the instrument panel as molded without the flexible tethering layer and includes a diagrammatic view of spraying apparatus for forming the flexible tethering layer.

The tethering layer 50 may also be formed in place on the inner side of the instrument panel by spraying the tether forming plastics material as illustrated in FIG. 7. This is preferably accomplished with a mask 80 of controlled thickness that is laid against the side 52 of the mounting/hinge flange 36 and the inner side 54 of the frangible door portion 46 in interfacing relationship therewith and has an opening 82 that defines the periphery of the tethering layer 50. The mask 80 has the desired thickness of the tethering layer or a slightly greater thickness and may be formed of metal or plastic and either be flexible so as to readily conform to the surface to be masked or be preformed with the required interfacing shape. The mask 80 is held in place by suitable means such as by flanges 84 fixed to a robot arm and the outer surface 86 of the mask is coated with a suitable release agent such as silicone to prevent the tether forming plastics material from adhering thereto.

With the mask 80 held in place on the inner side of the instrument panel, the tether forming plastics material is sprayed through the mask opening 82 onto the unmasked area of the panel to form the tethering layer 50 using a conventional type plastics spraying system 88 that includes a suitable mixing head 90 having a spray wand 92. The spraying system 88 operates in a conventional manner to effect spraying on command and wherein reactive components of the plastics material are delivered to the mixing head 90 by separate lines 94 and 96 and these components are mixed in the mixing head just prior to spraying with the wand 92. The mixing head 90 may be manipulated by an operator or a robot and the mixed plastics material is dispensed from the mixing head through the spray wand onto the unmasked area of side 52 of the mounting/hinge flange 36 and the inner side 54 of the frangible door portion 46 as illustrated in FIG. 7 to form the tethering layer to the desired controlled thickness. Then on setting of the sprayed plastics material, the mask is removed leaving the tethering layer in place and bonded without adhesive to the instrument panel.

Summarizing examples of the plastics materials that can be used in the above molding processes to form the tethering layer; the gravity molding material can be a thermoset material such as polyurethane, the resin transfer molding material can be a thermoset material such as polyester, the reaction injection molding material can be a thermoset material such as polyurethane, the spray molding material can be a thermoset material such as polyurethane, and the injection molding material can be thermoplastic material such as polyolefin.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. A method of forming a motor vehicle instrument panel with an integral flexibly tethered air bag deployment door comprising the steps of:
    providing a first plastics material;
    providing a second plastics material bondable to the first plastics material and remaining ductile to a substantial degree at low temperatures substantially below a temperature at which the first plastics material becomes brittle;
    molding an instrument panel with the first plastics material to a desired shape that includes an integral air bag deployment door and an integral mounting/hinge flange molded with the panel and extending inward from an inner side of said door; and
    integrally molding a tethering layer of the second plastics material onto a bonding area of a back inner side of the instrument panel, the bonding area including one side of said mounting/hinge flange, an inner side of a frangible portion of said door, and a potential fracture zone disposed between and adjoining the mounting/hinge flange and the frangible portion of the door to prevent the frangible portion of the door from breaking loose from the mounting/hinge flange if a fracture forms in the potential fracture zone as the door opens in response to air bag inflation.

2. The method set forth in claim 1 wherein said tethering layer is formed so as to extend substantially the length of said mounting/hinge flange and said frangible door portion and over an extensive laterally tending area of said one side of said flange and said inner side of said frangible door portion.

3. The method set forth in claim 1 wherein said instrument panel is formed by injecting said first plastics material in a molten state into an injection mold.

4. The method set forth in claim 1 wherein said instrument panel is formed by reaction injection molding said first plastics material in a reaction injection mold.

5. The method set forth in claim 1 wherein said tethering layer is formed with a controlled thickness.

6. A method of forming a motor vehicle instrument panel with an integral flexibly tethered air bag deployment door comprising the steps of:
    molding an instrument panel with a first plastics material to a desired shape and with an integral air bag deployment door whose opening is defined by a tear seam formed by a groove molded in one side of the panel and with an integral mounting/hinge flange molded with the panel that extends from an inner side of said door; and
    forming a flexible bonded door tethering layer of second plastics material on one side of said mounting/hinge flange on said inner side of said door, and spanning a frangible portion thereof at said inner side wherein said second plastics material has the characteristics of bonding to said first plastics material and remaining ductile to a substantial degree at low temperatures substantially below the temperature at which said first plastics material becomes brittle to thereby form a flexible tether that connects said frangible door portion to said mounting/hinge flange when said frangible door portion breaks away from said flange because of embrittlement of said first plastics material at said low temperatures on tearing of said tear seam and opening movement of said door by an inflating air bag pressing against said inner side of said frangible door portion and wherein said tethering layer is formed by injection molding said second plastics material against said one side of said mounting/hinge flange and said inner side of said frangible door portion.

7. A method of forming a motor vehicle instrument panel with an integral flexibly tethered air bag deployment door comprising the steps of:
    molding an instrument panel with a first plastics material to a desired shape and with an integral air bag deployment door whose opening is defined by a tear seam formed by a groove molded in one side of the panel and with an integral mounting/hinge flange molded with the panel that extends from an inner side of said door; and
    forming a flexible bonded door tethering layer of second plastics material on one side of said mounting/hinge flange on said inner side of said door, and spanning a frangible portion thereof at said inner side wherein said second plastics material has the characteristics of bonding to said first plastics material and remaining ductile to a substantial degree at low temperatures substantially below the temperature at which said first plastics material becomes brittle to thereby form a flexible tether that connects said frangible door portion to said mounting/hinge flange when said frangible door portion breaks away from said flange because of embrittlement of said first plastics material at said low temperatures on tearing of said tear seam and opening movement of said door by an inflating air bag pressing against said inner side of said frangible door portion and further comprising the steps of forming said tethering layer by forming a mask having an opening conforming to the perimeter of the bonding layer that is desired, laying said mask against said one side of said mounting/hinge flange and said inner side of said frangible door portion, and spraying said second plastics material through said opening in said mask and onto said one side of said mounting/hinge flange and said inner side of said frangible door portion to form said bonded layer.

8. A method of forming a motor vehicle instrument panel with an integral flexibly tethered air baa deployment door comprising the steps of:

molding an instrument panel with a first plastics material to a desired shape and with an integral air bag deployment door whose opening is defined by a tear seam formed by a groove molded in one side of the panel and with an integral mounting/hinge flange molded with the panel that extends from an inner side of said door; and forming a flexible bonded door tethering layer of second plastics material on one side of said mounting/hinge flange on said inner side of said door, and spanning a frangible portion thereof at said inner side wherein said second plastics material has the characteristics of bonding to said first plastics material and remaining ductile to a substantial degree at low temperatures substantially below the temperature at which said first plastics material becomes brittle to thereby form a flexible tether that connects said frangible door portion to said mounting/hinge flange when said frangible door portion breaks away from said flange because of embrittlement of said first plastics material at said low temperatures on tearing of said tear seam and opening movement of said door by an inflating air bag pressing against said inner side of said frangible door portion and wherein said tethering layer is formed by gravity molding said second plastics material on said one side of said mounting/hinge flange and said inner side of said frangible door portion.

9. A method of forming a motor vehicle instrument panel with an integral flexibly tethered air bag deployment door comprising the steps of:

molding an instrument panel with a first plastics material to a desired shape and with an integral air bag deployment door whose opening is defined by a tear seam formed by a groove molded in one side of the panel and with an integral mounting/hinge flange molded with the panel that extends from an inner side of said door; and forming a flexible bonded door tethering layer of second plastics material on one side of said mounting/hinge flange on said inner side of said door, and spanning a frangible portion thereof at said inner side wherein said second plastics material has the characteristics of bonding to said first plastics material and remaining ductile to a substantial degree at low temperatures substantially below the temperature at which said first plastics material becomes brittle to thereby form a flexible tether that connects said frangible door portion to said mounting/hinge flange when said frangible door portion breaks away from said flange because of embrittlement of said first plastics material at said low temperatures on tearing of said tear seam and opening movement of said door by an inflating air bag pressing against said inner side of said frangible door portion and wherein said tethering layer is formed by reaction injection molding said second plastics material on said one side of said mounting/hinge flange and said inner side of said frangible door portion.

10. A method of forming a motor vehicle instrument panel with an integral flexibly tethered air bag deployment door comprising the steps of:

molding an instrument panel with a first plastics material to a desired shape and with an integral air bag deployment door whose opening is defined by a tear seam formed by a groove molded in one side of the panel and with an integral mounting/hinge flange molded with the panel that extends from an inner side of said door; and forming a flexible bonded door tethering layer of second plastics material on one side of said mounting/hinge flange on said inner side of said door, and spanning a frangible portion thereof at said inner side wherein said second plastics material has the characteristics of bonding to said first plastics material and remaining ductile to a substantial degree at low temperatures substantially below the temperature at which said first plastics material becomes brittle to thereby form a flexible tether that connects said frangible door portion to said mounting/hinge flange when said frangible door portion breaks away from said flange because of embrittlement of said first plastics material at said low temperatures on tearing of said tear seam and opening movement of said door by an inflating air bag pressing against said inner side of said frangible door portion and wherein said tethering layer is formed by resin transfer molding said second plastics material on said one side of said mounting/hinge flange and said inner side of said frangible door portion.

11. A method of forming a motor vehicle instrument panel with an integral flexibly tethered air bag deployment door comprising the steps of:

molding an instrument panel with a first plastics material to a desired shape and with an integral air bag deployment door whose opening is defined by a tear seam formed by a aroove molded in one side of the panel and with an integral mounting/hinge flange molded with the panel that extends from an inner side of said door; and forming a flexible bonded door tethering layer of second plastics material on one side of said mounting/hinge flange on said inner side of said door, and spanning a frangible portion thereof at said inner side wherein said second plastics material has the characteristics of bonding to said first plastics material and remaining ductile to a substantial degree at low temperatures substantially below the temperature at which said first plastics material becomes brittle to thereby form a flexible tether that connects said frangible door portion to said mounting/hinge flange when said frangible door portion breaks away from said flange because of embrittlement of said first plastics material at said low temperatures on tearing of said tear seam and opening movement of said door by an inflating air bag pressing against said inner side of said frangible door portion and wherein said tethering layer is formed by locating an injection mold tool against said one side of said mounting/hinge flange and said inner side of said frangible door portion, and injection molding said second plastics material in said mold tool against said one side of said mounting/hinge flange and said inner side of said frangible door portion.

12. A method of forming a motor vehicle instrument panel with an integral flexibly tethered air bag deployment door comprising the steps of:

molding an instrument panel with a first plastics material to a desired shape and with an integral air bag deployment door whose opening is defined by a tear seam formed by a groove molded in one side of the panel and with an integral mounting/hinge flange molded with the panel that extends from an inner side of said door; and forming a flexible bonded door tethering layer of second plastics material on one side of said mounting/hinge flange on said inner side of said door, and spanning a frangible portion thereof at said inner side wherein said second plastics material has the characteristics of bonding to said first plastics material and remaining ductile to a substantial degree at low temperatures substantially below the temperature at which said first plastics material becomes brittle to thereby form a flexible tether that connects said frangible door portion to said mounting/hinge flange when said frangible door portion breaks away from said flange because of embrittlement of said first plastics material at said low temperatures on tearing of said tear seam and opening movement of said door by an inflating air bag pressing against said inner side of said frangible door portion and wherein said tethering layer is formed by locating a low pressure mold tool against said one side of said mounting/hinge flange and said inner side of said frangible door portion, and molding said second plastics material in said mold tool on said one side of said mounting/hinge flange and said inner side of said frangible door portion at a low pressure less than high pressure injection molding.

* * * * *